(12) United States Patent
Kim

(10) Patent No.: US 6,717,768 B2
(45) Date of Patent: Apr. 6, 2004

(54) AIRFLOW DAMPER FOR REDUCING AIRBORNE NOISE AND VIBRATION IN AN INFORMATION STORAGE DEVICE

(75) Inventor: Seonghoon Kim, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 97 days.

(21) Appl. No.: 09/977,324

(22) Filed: Oct. 16, 2001

(65) Prior Publication Data

US 2003/0076621 A1 Apr. 24, 2003

(51) Int. Cl.[7] .............................................. G11B 33/14
(52) U.S. Cl. ...................... 360/97.02; 369/261; 369/258
(58) Field of Search ........................ 360/97.02; 369/261, 369/97, 258

(56) References Cited

U.S. PATENT DOCUMENTS

| | | | | |
|---|---|---|---|---|
| 4,280,155 A | * | 7/1981 | Scott et al. ............... | 360/97.03 |
| 4,583,213 A | * | 4/1986 | Bracken et al. ............. | 369/261 |
| 5,631,787 A | * | 5/1997 | Huang et al. ............ | 360/97.02 |
| 5,898,545 A | * | 4/1999 | Schirle ..................... | 360/254.7 |
| 6,128,159 A | * | 10/2000 | Ino .......................... | 360/97.02 |
| 6,236,532 B1 | * | 5/2001 | Yanagisawa ............. | 360/97.02 |
| 6,487,038 B1 | * | 11/2002 | Izumi et al. ............. | 360/97.02 |

* cited by examiner

*Primary Examiner*—A. J. Heinz
*Assistant Examiner*—Mark Blouin
(74) *Attorney, Agent, or Firm*—Volentine Francos, PLLC; Jeffrey P. Aiello

(57) ABSTRACT

An airflow damper is affixed to a top interior wall of a hard disk assembly, so that a specified gap distance between the airflow damper and an upper disk within the hard disk assembly is realized. The gap distance is determined as a function of velocity of the driven disks. The airflow damper is designed to have a thickness so that the determined gap distance is realized for the given velocity. The airflow damper eliminates secondary airflow within the hard disk assembly, to prevent formation of a large vortex above the upper disk and to thus reduce airborne noise.

20 Claims, 6 Drawing Sheets

AIRFLOW DAMPER FOR REDUCING AIRBORNE NOISE AND VIBRATION IN AN INFORMATION STORAGE DEVICE

BACKGROUND OF THE INVENTION

1. Field of the Invention

The present invention relates to an information storage device and method for reducing airborne noise and vibration. Particularly, the present invention relates to an airflow damper that reduces airborne noise and vibration in hard disk drive devices.

2. Description of the Related Art

Airflow within a hard disk drive assembly generally tends to vibrate the disks during rotation, generating undesired noise in the hard disk drive assembly. In order to understand why airflow has such an important role in regulating airborne noise, it is necessary to examine airflow characteristics in a hard disk assembly (HDA).

FIG. 1 illustrates the main airflow streams in a conventional hard disk assembly.

As shown in FIG. 1, the hard disk assembly (HDA) 100 includes a hub 110, first and second disks 120 and 130 mounted on hub 110, and a housing cover 140. The first and second disks 120 and 130 are rotated by hub 110. In FIG. 1, h is understood to be the distance between upper disk 120 and the top inner surface of housing cover 140, and $d_\theta d_\theta$ is understood to be the distance between the edges of disks 120, 130 and the sidewall of housing cover 140.

When first and second disks 120 and 130 are rotatably driven by hub 110, the disks pull fluid (air) axially downward and pump the air radially outward. For example, air is pulled downward along hub 110 from the space above rotating disk 120. This axial downward air then flows radially outward along the upper surface of rotating disk 120.

The main airflow in HDA 100 is thus tangential to the circumferential edge of rotating disks 120 and 130, as represented by the upward and downward arrows along the periphery of rotating disks 120 and 130. The radially outward flow along the surface of the disks operates as a secondary flow caused by a rotating boundary layer. The rotating boundary layer that is formed is designated by $\delta_m$ and $\delta_f$ in FIG. 1, and is commonly referred to as the Ekman layer, which will be described in greater detail as follows.

A qualitative description of airflow and the boundary layers is as follows. Because of the no-slip condition of disks 120 and 130 with respect to airflow, fluid in contact with the surface of the rotating disks 120 and 130 rotates with the same angular velocity as the disk surface, and experiences the same centripetal acceleration. At the start of motion of the disks, a boundary layer of fluid begins to form in the circumferential direction. The fluid in the boundary layer begins to spin, but cannot maintain the same centripetal acceleration as the surface of the disk, because of fluid viscosity. Because of this, the boundary layer acquires an outward radial component. As the radial component of fluid flow increases in magnitude, a secondary fluid layer develops in a radial direction, having stresses that are centrally directed. These stresses provide the secondary fluid layer with a central force, and have a centripetal acceleration that is greater than zero but less than that of the surface of the disk. This secondary fluid layer, which may be understood as having components $\delta_m$ and $\delta_f$ as designated in FIG. 1, comprises the Ekman layer.

The Ekman layer component $\delta_m$ is formed near the surface of the disk 120 by disk rotation, and is defined as having a thickness (depth in the vertical direction) of 4δ, whereby:

$$\delta \sim \sqrt{\frac{\nu}{\Omega}}, \quad \text{Eq. (1)}$$

and wherein ν is the dynamic viscosity of the fluid forming the boundary layer and Ω is the angular velocity of the disk. The Ekman layer component $\delta_f$ is formed near the top inner surface of housing cover 140 by fluid (air) rotation, and is defined as having a thickness (or depth in the vertical direction) of 8δ.

By way of example, if Ω=5,400 rpm, δ=0.17 mm (the dynamic viscosity of air is $1.59 \times 10^{-5}/m^2/s$). The Ekman layer component $\delta_m$ thus has a thickness of 0.68 mm and the Ekman layer component $\delta_f$ has a thickness of 1.36 mm. Likewise, if Ω=7,200 rpm, δ=0.15 mm, the Ekman layer component $\delta_m$ has a thickness of 0.60 mm and the Ekman layer component $\delta_f$ has a thickness of 1.2 mm.

As further illustrated in FIG. 1, a large vortex 102 is created between secondary fluid layers $\delta_m$ and $\delta_f$ which comprise the Ekman layer. The creation of large vortex 102 excites disk fluttering during operation of the HDA, thus increasing noise level.

SUMMARY OF THE INVENTION

The present invention is therefore directed to an information storage device and method for reducing airborne noise and vibration, which substantially overcomes one or more of the problems due to the limitations and disadvantages of the related art.

Accordingly, to solve the above and other problems, it is an object of the present invention to provide a hard disk drive and method for reducing airborne noise and vibration, that prevents formation of a large air vortex above the disks in the hard disk assembly during rotation of the disks.

The above and other objects may be achieved by a hard disk assembly including in combination a housing; a hub within the housing; at least one disk mounted on the hub and rotated by the hub; and an airflow damper, mounted on an upper surface of an interior of the housing, that prevents formation of a vortex above the at least one disk during rotation of the at least one disk, the airflow damper having a thickness related to rotational speed of the at least one disk.

The above and other objects may also be achieved by a method of preventing vortex formation in a hard disk assembly, the hard disk assembly having a housing with a hub therein on which at least one disk is mounted and driven to be rotated, the method including providing an airflow damper on an upper surface of an interior of the housing, the airflow damper having a thickness related to rotational speed of the disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be described as follows with reference to FIGS. 2–6. It is however to be understood that FIGS. 2–4 in particular are given by way of illustration only, and are not to scale. Dimensions and size of the components have been exaggerated for the purpose of clarity and to improve understanding.

Figure 2:
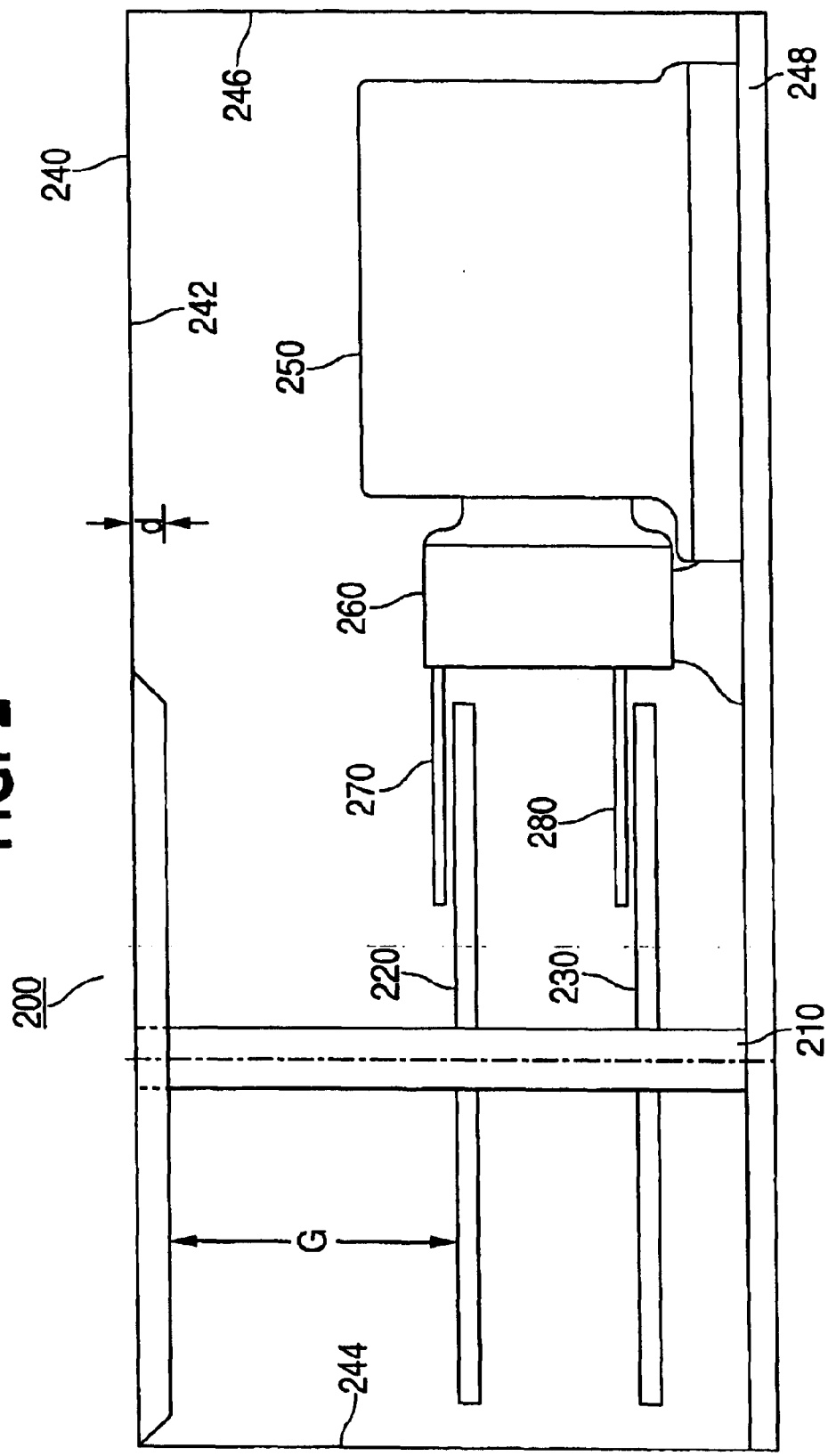
FIG. 2 illustrates a hard disk assembly according to a preferred embodiment of the present invention, as including an airflow damper.

As illustrated in FIG. 2, hard disk assembly (HDA) 200 includes base plate 248, and housing 240 having top wall 242 and side walls 244 and 246. Housing 240 is removably mounted on base plate 248 by way of fasteners or screws (not shown). Generally, integrated circuitry (not shown) is formed on the underside of base plate 248, and electrical connectors (not shown) are mounted along a side edge of base plate 248 to provide external communication. For example, base plate 248 may be formed of steel and housing 240 may be a metal/plastic enclosure, although not limited thereto. As further illustrated, HDA 200 includes an actuator drive assembly 250 including an actuator 260 having actuator arms 270 and 280 extending therefrom to read information recorded on disks 220 and 230. Actuator drive assembly 250, actuator 260 and actuator arms 270 and 280 are conventional components in the information storage art as would be understood by one of ordinary skill, and thus detailed description thereof is omitted.

As further illustrated, disks 220 and 230 are mounted on hub 210 and are rotated by hub 210. Standard rotational speeds of disks 220 and 230 include 4,000; 5,400; 7,200; 10,000; and 12,000 rpm. Airflow damper 290 is mounted on the interior of top wall 242 of housing 240, above disks 220 and 230. Airflow damper 290 may be steel or aluminum, or any suitable material that does not provide outgassing. Airflow damper 290 is affixed to the interior of top wall 242 by way of an adhesive, such as glue or double-sided tape, for example. It should be understood that the material of airflow damper 290 and the manner in which it is affixed to top wall 242 as noted above is merely by way of example only, and thus should not be considered as limiting, since any suitable material or fixing mechanism as appropriate may be used.

Figure 3:
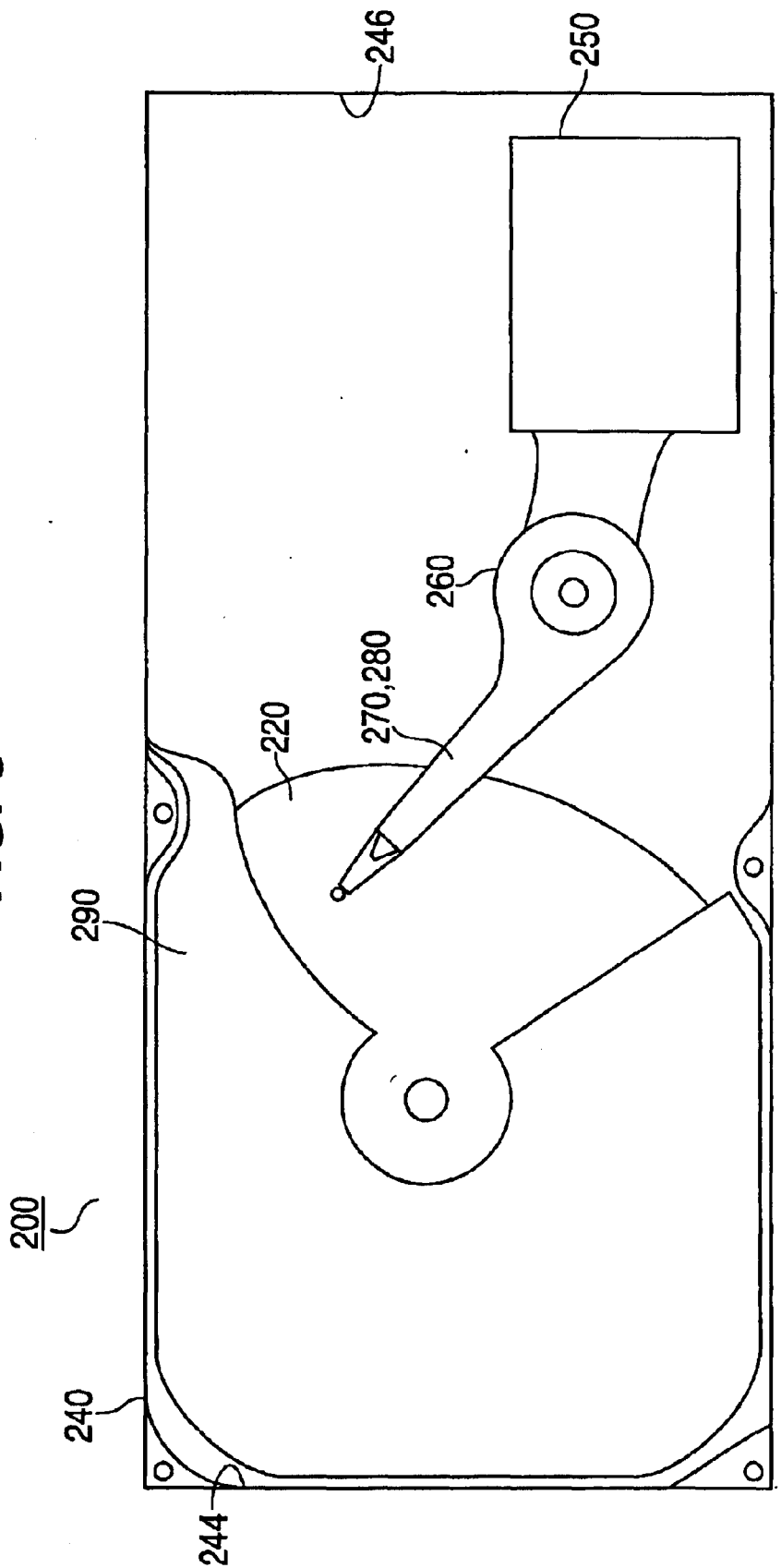
FIG. 3 illustrates an overhead view of the hard disk assembly of FIG. 2.
Figure 4:
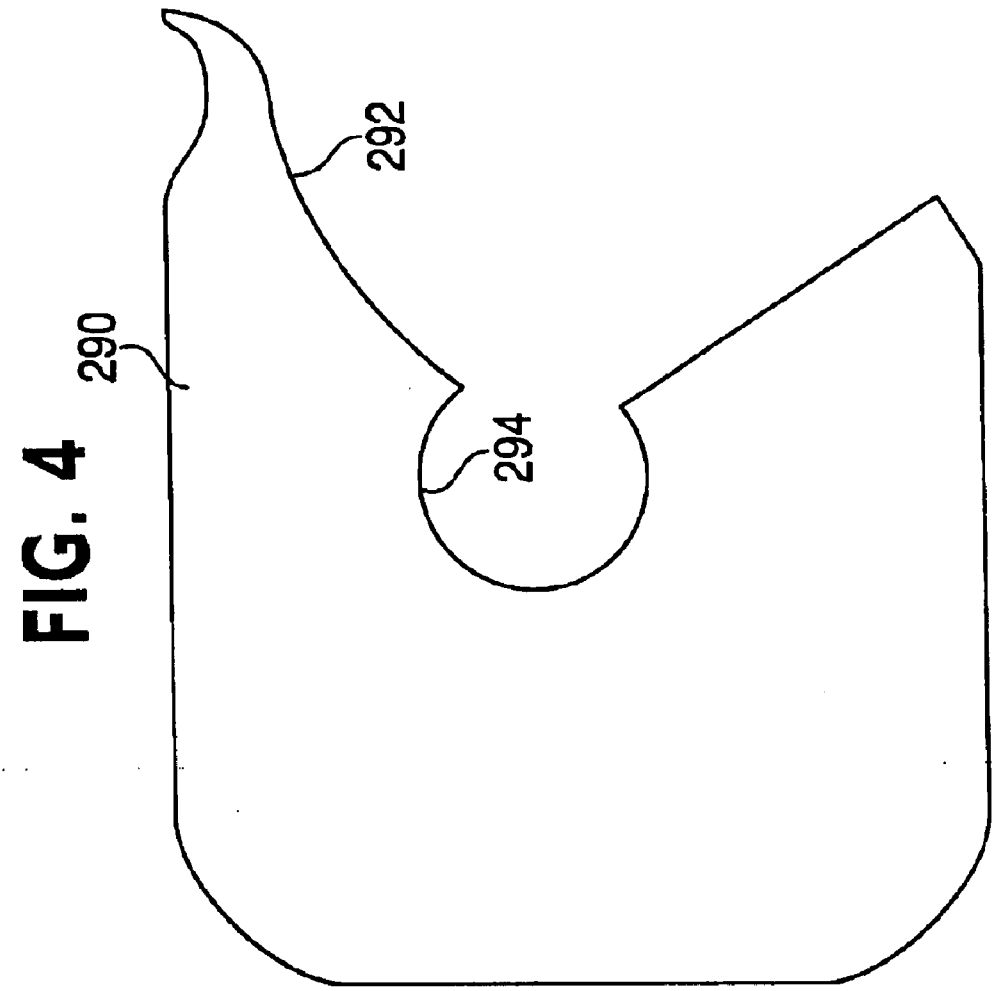
FIG. 4 illustrates an example of an airflow damper of a preferred embodiment of the present invention.

As further illustrated in FIGS. 3 and 4, airflow damper 290 may be considered as horse-shoe shaped or c-shaped, with an opened end 292 as particularly denoted in FIG. 4. Damper 290 has a semi-circular shaped central portion 294 that fits around hub 210 when damper 290 is affixed to top wall 242. Opened end portion 292 of airflow damper 290 provides a space whereat disks 220, 230 are exposed, and whereby actuator arm 270 extends along the surface of disk 220 below opened end portion 292 of airflow damper 290. Opened end portion 292 of airflow damper 290 helps to maintain sufficient airflow within HDA 200, so that airflow near actuator arms 270 and 280 is not disrupted.

Figure 1:
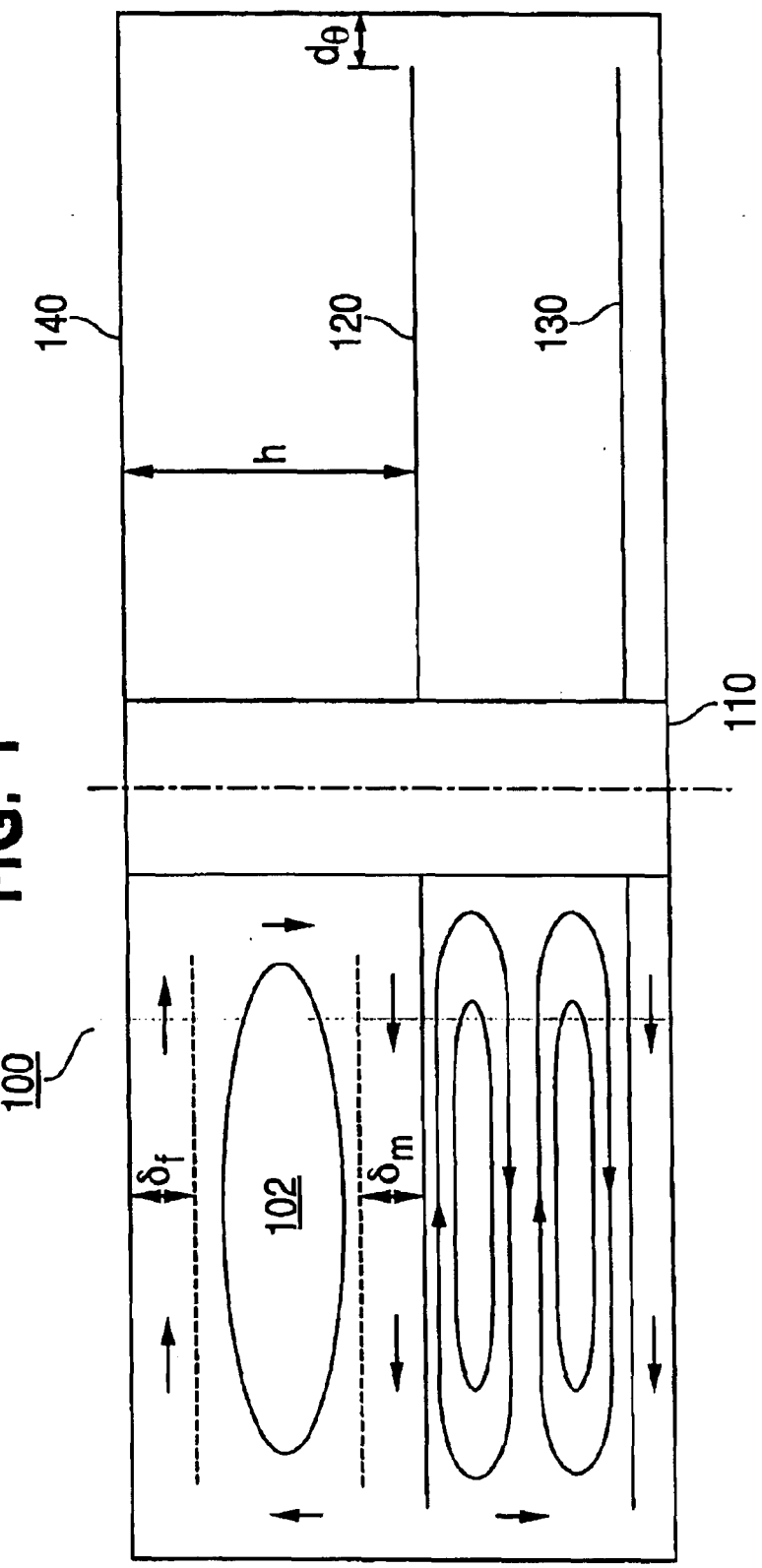
FIG. 1 illustrates airflow within a conventional hard disk assembly.

The manner in which airborne noises are reduced within HDA 200 by airflow damper 290 is explained as follows. In conventional HDAs such as illustrated and described with respect to FIG. 1, gap h between upper disk 120 and the top wall of HDA housing 140 is several times larger than Ekman layer component $\delta_m$, for example 3 to 5 times larger. In such cases, airflow within the HDA has a secondary flow pattern that is radially outward near the upper disk and inward near the top wall of the housing. These secondary airflows are connected by axial flows near the periphery of the disk and near the hub, as understood in view of FIG. 1. These secondary airflows easily dominate airflow within the HDA. In the case that gap h is more than 3 to 5 times larger than that of Ekman layer component $\delta_m$, a significant quantity of fluid in the interior region is essentially isolated from the main airflow in the HDA. This isolated quantity of airflow rotates approximately as a rigid body at one half the angular velocity of the disk. These flow characteristics create the large vortex 102 illustrated in FIG. 1, and accelerate disk tilting, to create severe airborne noise.

In a preferred embodiment as described with respect to FIGS. 2–4, airflow damper 290 reduces airborne noise by preventing formation of a large vortex near the top area of HDA 200 above upper disk 220. Airflow damper 290 is affixed to and extends downward from top wall 242 of housing 240, so that gap G between airflow damper 290 and upper disk 220 is too narrow for secondary airflow to exist. The fluid between airflow damper 290 and upper disk 220 is characterized as having a Couette flow pattern, which is a nearly straight-line, tangential profile. Since secondary airflow is eliminated by airflow damper 290, the large vortex is prevented from forming, thus reducing vibration that causes airborne noise.

As should be understood in view of the previous discussion with respect to the Ekman layer and Eq. (1), the thickness (depth in the vertical direction) of the Ekman layer components are a function of angular velocity Ω (rpm) of the disks. Thus, the gap distance G between upper disk 220 and airflow damper 290 necessary to eliminate secondary airflow above disk 220, is a function of angular velocity of the disks. To this end, airflow damper 290 of the present invention is designed to have thickness d so that gap distance G has appropriate width for a given angular velocity, to eliminate secondary airflow above upper disk 220 and to thus prevent formation of the large vortex.

TABLE 1

| rpm (Ω) | $\delta_m$ (mm) |
|---|---|
| 4,000 | 0.799 |
| 5,400 | 0.688 |
| 7,200 | 0.588 |
| 10,000 | 0.50 |
| 12,000 | 0.46 |

Table 1 includes values of Ekman layer component $\delta_m$ for standard disk velocities of 4,000; 5,400; 7,200; 10,000; and 12,000 rpm. The values $\delta_m$ in Table 1 correspond to the thickness (depth in the vertical direction) of Ekman layer component $\delta_m$. Accordingly, if airflow damper 290 is designed to have a thickness d so that gap distance G is realized for a given disk velocity, the space above disk 220 will be too narrow for the secondary airflow to exist when the disk is rotated at that given velocity. Secondary airflow above the disk is thus eliminated, and formation of the large vortex is prevented.

For example, if HDA 200 of FIG. 2 is set to drive disks 220 and 230 at 4,000 rpm, the thickness of the Ekman layer component $\delta_m$ is determined by way of Eq. (1) as 0.799 mm, and airflow damper 290 is designed to have a thickness d so that gap distance G between airflow damper 290 and upper disk 220 is 0.799 mm. This eliminates secondary airflow and thus prevents formation of the large vortex. Similarly, in the case that HDA 200 is set to drive disks 220 and 230 at a standard velocity of 10,000 rpm, the thickness d of airflow damper 290 is selected so that gap distance G is 0.50 mm. As may be readily understood in view of Table 1, proper gap distance G ranges from approximately 0.9 to 0.3 mm for the standard velocities including 4,000; 5,400; 7,200; 10,000; and 12,000 rpm.

Figure 5:
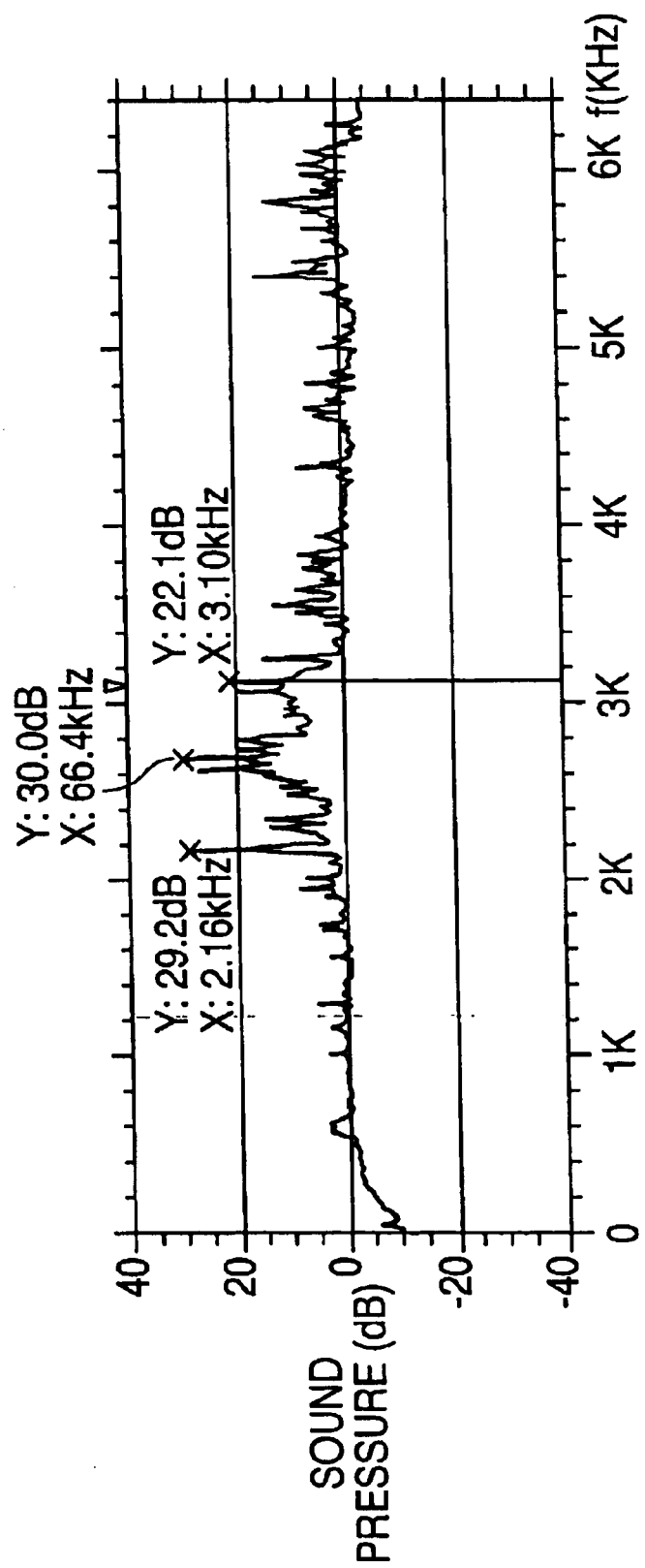
FIG. 5 is a graph showing the noise level in a conventional hard disk assembly.
Figure 6:
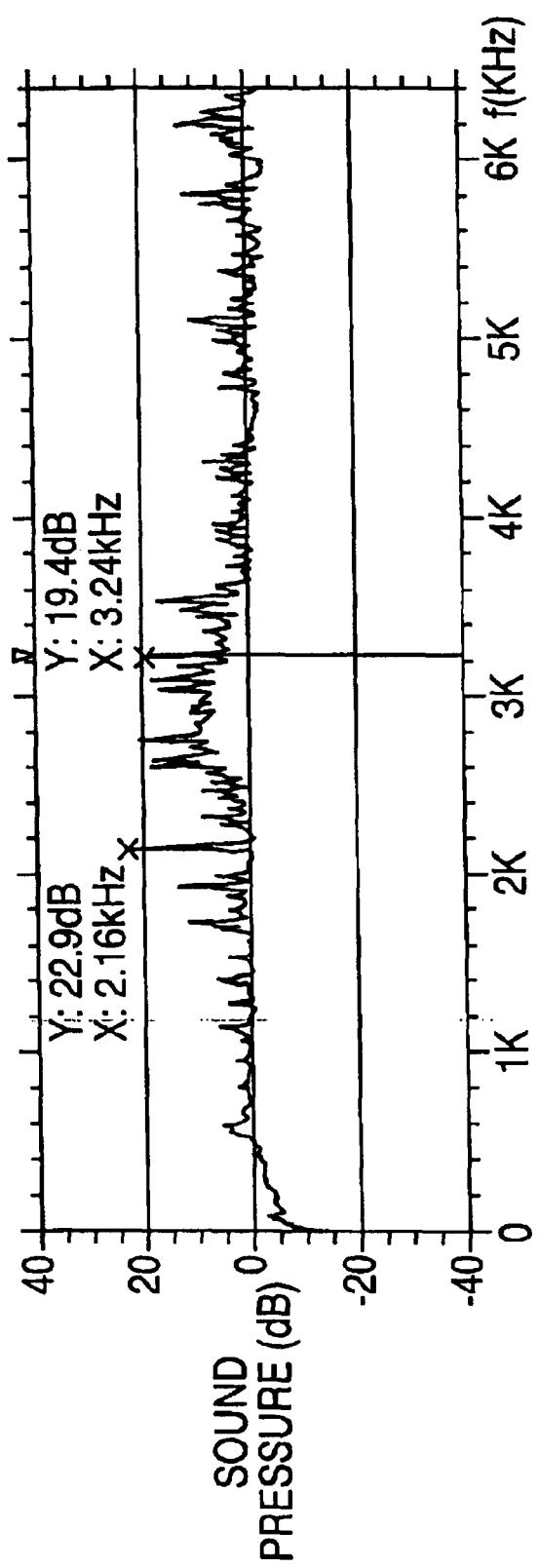
FIG. 6 is a graph showing the noise level in a hard disk assembly according to a preferred embodiment of the present invention, as including an airflow damper.

FIGS. 5 and 6 are graphs respectively showing the noise level in a conventional hard disk assembly, and in a hard disk assembly according to a preferred embodiment of the present invention as including an airflow damper. In particular, FIG. 5 shows the noise level (sound pressure in dB) in a conventional hard disk assembly over a frequency range of approximately 0–6 kHz, and FIG. 6 shows the noise level in a hard disk assembly according to a preferred embodiment of the present invention, over the same frequency range. As may be appreciated in view of FIGS. 5 and 6, a 20% reduction in noise level can be achieved by use of the airflow damper in accordance with a preferred embodiment of the present invention.

It should be understood that the above description and drawings are given by way of illustration only, and thus should not be construed as limiting. For example, the shape of the airflow damper is illustrated and characterized as horse-shoe shaped or c-shaped. However, the airflow damper may have other shapes, but necessarily including an opened end portion beneath which actuator arms of the HDA extend along the corresponding disks. Also, although the preferred embodiment is described specifically with respect to an HDA including two disks, the airflow damper of the present invention functions equally well to prevent formation of a large vortex in an HDA or other type of assembly having any number of disks, such as an HDA having one disk or an HDA having more than two disks. Furthermore, the concept of the airflow damper should not be limited as for use in HDAs only, but can be adopted for use in other disk operating devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A hard disk assembly comprising:
a housing;
a hub within the housing;
at least one disk mounted on the hub and rotated by the hub; and
an airflow damper, mounted on an upper surface of an interior of the housing, that prevents formation of a vortex above the at least one disk during rotation of the at least one disk,
the airflow damper having a thickness related to rotational speed of the at least one disk.

2. The hard disk assembly of claim 1, wherein the airflow damper is mounted on the interior of the housing with an adhesive.

3. The hard disk assembly of claim 2, wherein the adhesive is a glue.

4. The hard disk assembly of claim 3, wherein the adhesive comprises double-sided tape.

5. The hard disk assembly of claim 1, wherein a gap distance between the at last one disk and the airflow damper is a function of the rotational speed of the at least one disk.

6. The hard disk assembly of claim 5, wherein the gap distance is within a range of about 0.3 mm to 0.9 mm.

7. The hard disk assembly of claim 1, further comprising an actuator including at least one actuator arm that extends over the at least one disk to read information therefrom.

8. The hard disk assembly of claim 7, wherein the airflow damper is substantially horse-shoe shaped, and the at least one actuator arm extends over the at least one disk beneath an opened end portion of the airflow damper.

9. The hard disk assembly of claim 1, wherein the airflow damper is steel.

10. The hard disk assembly of claim 1, wherein the airflow damper is aluminum.

11. The hard disk assembly of claim 1, including two disks mounted on the hub.

12. A method of preventing vortex formation in a hard disk assembly, the hard disk assembly having a housing with a hub therein on which at least one disk is mounted and driven to be rotated, the method comprising:
providing an airflow damper on an upper surface of an interior of the housing, the airflow damper having a thickness related to rotational speed of the at least one disk.

13. The method of preventing vortex formation in a hard disk assembly of claim 12, wherein said providing comprises mounting the airflow damper on the interior of the housing with an adhesive.

14. The method of preventing vortex formation in a hard disk assembly of claim 13, wherein the adhesive is a glue.

15. The method of preventing vortex formation in a hard disk assembly of claim 13, wherein the adhesive is double-sided tape.

16. The method of preventing vortex formation in a hard disk assembly of claim 12, wherein said providing comprises mounting the airflow damper on the interior of the housing so that a gap distance between the at least one disk and the airflow damper is related to the rotational speed of the at least one disk.

17. The method of preventing vortex formation in a hard disk assembly of claim 16, wherein the gap distance is within a range of about 0.3 mm to 0.9 mm.

18. The method of preventing vortex formation in a hard disk assembly of claim 12, wherein said providing comprises mounting an airflow damper that is substantially horse-shoe shaped, so that an actuator arm for reading the at least one disk extends over the at least one disk beneath an opened end portion of the airflow damper.

19. The method of preventing vortex formation in a hard disk assembly of claim 12, wherein said providing comprises mounting an airflow damper that is steel.

20. The method of preventing vortex formation in a hard disk assembly of claim 12, wherein said providing comprises mounting an airflow damper that is aluminum.

* * * * *